United States Patent
Akasam et al.

(10) Patent No.: US 7,484,583 B2
(45) Date of Patent: Feb. 3, 2009

(54) AUXILIARY POWER UNIT FOR MOVING A VEHICLE

(75) Inventors: Sivaprasad Akasam, Peoria, IL (US);
Kris W. Johnson, Peoria, IL (US);
Matthew D. Johnson, Peoria, IL (US);
Larry M. Slone, Washington, IL (US);
James Milton Welter, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 12 days.

(21) Appl. No.: 11/529,514

(22) Filed: Sep. 29, 2006

(65) Prior Publication Data

US 2008/0078592 A1  Apr. 3, 2008

(51) Int. Cl.
*B60K 6/00* (2007.10)

(52) U.S. Cl. .................. 180/65.2; 180/65.8; 701/22

(58) Field of Classification Search .............. 180/65.1, 180/65.2, 65.3, 65.4, 65.6, 65.8; 903/903, 903/904, 917, 923; 701/22
See application file for complete search history.

(56) References Cited

U.S. PATENT DOCUMENTS

| | | | |
|---|---|---|---|
| 2,923,171 A | 2/1960 | Jedrzykowski | |
| 3,367,438 A * | 2/1968 | Moore | 180/65.2 |
| 3,599,814 A | 8/1971 | Brownfield | |
| 4,189,021 A | 2/1980 | Scheuerpflug et al. | |
| 4,405,029 A * | 9/1983 | Hunt | 180/65.2 |
| 4,448,157 A | 5/1984 | Eckstein et al. | |
| 4,684,081 A | 8/1987 | Cronin | |
| 5,190,118 A | 3/1993 | Yelton | |
| 5,193,634 A * | 3/1993 | Masut | 180/65.2 |
| 5,309,708 A | 5/1994 | Stewart, Jr. et al. | |
| 5,333,678 A | 8/1994 | Mellum et al. | |
| 5,343,778 A | 9/1994 | Romero et al. | |
| 5,528,901 A | 6/1996 | Willis | |
| 5,847,470 A * | 12/1998 | Mitchell | 180/65.4 |
| 6,142,418 A | 11/2000 | Weber et al. | |
| 6,247,668 B1 | 6/2001 | Reysa et al. | |
| 6,278,262 B1 | 8/2001 | Ullyott | |
| 6,718,758 B1 * | 4/2004 | Suzuki | 180/65.2 |
| 6,928,962 B2 * | 8/2005 | Yamazaki | 123/41.05 |
| 7,271,555 B1 * | 9/2007 | Ciccone | 180/65.1 |
| 2003/0104899 A1 | 6/2003 | Keller | |
| 2004/0104578 A1 | 6/2004 | Wurtele | |
| 2005/0000161 A1 | 1/2005 | Petersson et al. | |
| 2005/0001606 A1 | 1/2005 | Kagoshima | |
| 2005/0035657 A1 | 2/2005 | Brummett et al. | |
| 2005/0049771 A1* | 3/2005 | Kuang et al. | 701/51 |
| 2006/0137923 A1 | 6/2006 | Larson | |
| 2006/0137924 A1 | 6/2006 | Larson | |

FOREIGN PATENT DOCUMENTS

| | | |
|---|---|---|
| JP | 2001173024 A | 6/2001 |
| WO | WO 98/00306 | 1/1998 |
| WO | WO 03/072493 A1 | 9/2003 |
| WO | WO 2004/025098 A1 | 3/2004 |
| WO | WO 2006/008138 A1 | 1/2006 |

* cited by examiner

*Primary Examiner*—Hau V Phan
(74) *Attorney, Agent, or Firm*—Finnegan, Henderson, Farabow, Garrett & Dunner

(57) ABSTRACT

A power system is provided having at least one traction device and a primary power source configured to power the at least one traction device. In addition, the power system includes an auxiliary power source also configured to power the at least one traction device.

19 Claims, 3 Drawing Sheets

US 7,484,583 B2

AUXILIARY POWER UNIT FOR MOVING A VEHICLE

GOVERNMENT RIGHTS

This invention was made with government support under the terms of Contract No. DE-FC26-04NT42189 awarded by the Department of Energy. The government may have certain rights in this invention.

TECHNICAL FIELD

The present disclosure is directed to an auxiliary power unit for a vehicle and, more particularly, to an auxiliary power unit having the capability to move a vehicle.

BACKGROUND

Passenger vehicles and construction equipment are typically powered by a main internal combustion engine such as, for example, a four-stroke diesel engine. In order to start the main engine, an outside force must set the pistons of the engine in motion before the engine can power itself. The process of setting the pistons in motion is called a cranking event and involves rotating the crank shaft of the engine enough times at sufficient speed to initiate combustion within the engine. A cranking event is usually performed by a starter motor. Batteries or other powering devices are often used to supply power to the starter motor.

Cranking and starting a main engine may draw a significant amount of power from a work machine's on-board battery. Often, the on-board battery is designed to provide only three to four main engine cranking events before depleting the energy stored therein. Thus, if the engine fails to start after repeated attempts, and/or if the battery loses enough charge due to leakage, the charge present in the battery may be insufficient to start the main engine. It may be both costly and time consuming to bring in the necessary service equipment such as battery chargers or towing vehicles to remedy such a problem.

In addition, the work sites where construction equipment often operate, are inaccessible by ordinary vehicles. Such locations may include open-pit mines, forests, jungles, mountainous terrain, or any other isolated location. In any of these situations, it may be difficult or nearly impossible to reach the disabled vehicle.

U.S. Patent Application Publication No. 2005/0035657A1 to Brummett et al. ("Brummett"), published Feb. 17, 2005, describes a system that attempts to address the above mentioned issues. Brummett discloses a vehicle including a main engine, a main battery, and an auxiliary air conditioning system. The auxiliary air conditioning system includes an auxiliary four-stroke diesel engine and an auxiliary generator. In Brummett, the system monitors the voltage level of the main battery. When the voltage falls below a minimum threshold level, the auxiliary system charges the main battery. This procedure is performed until it is determined that the main battery contains enough power to be able to start the main engine. By utilizing an on-board battery charging system, Brummett eliminates the need to use separate servicing equipment such as a battery charger to charge the battery or a towing vehicle to move the disabled vehicle when the power level in the main battery is too low to start the main engine.

Although the system in Brummett may provide some assistance to a vehicle disabled by battery failure, it may be ineffective in other circumstances where the main engine fails. In particular, a main engine failure can be caused by any number of events, only one of which is the failure of the main battery. For example, a fully charged main battery may be unable to start the main engine if the crankshaft cannot turn, there is a hole in a cylinder, there is a fuel injection malfunction, or any other possible internal mechanical failure. Because the system in Brummett focuses only on charging the main battery, it may be unable to provide assistance or move the vehicle in other situations involving a main engine failure.

The present disclosure is directed towards overcoming one or more of the problems set forth above.

SUMMARY OF THE INVENTION

In one aspect, the present disclosure is directed toward a power system that includes at least one traction device and a primary power source configured to power the at least one traction device. Additionally, the power system includes an auxiliary power source also configured to power the set of traction devices.

Consistent with a further aspect of the disclosure, a method is provided for moving a machine. The method includes determining the startability of a main power source used to drive the machine. The method also includes driving the machine with an auxiliary power source in response to the determination.

DETAILED DESCRIPTION

Figure 1:
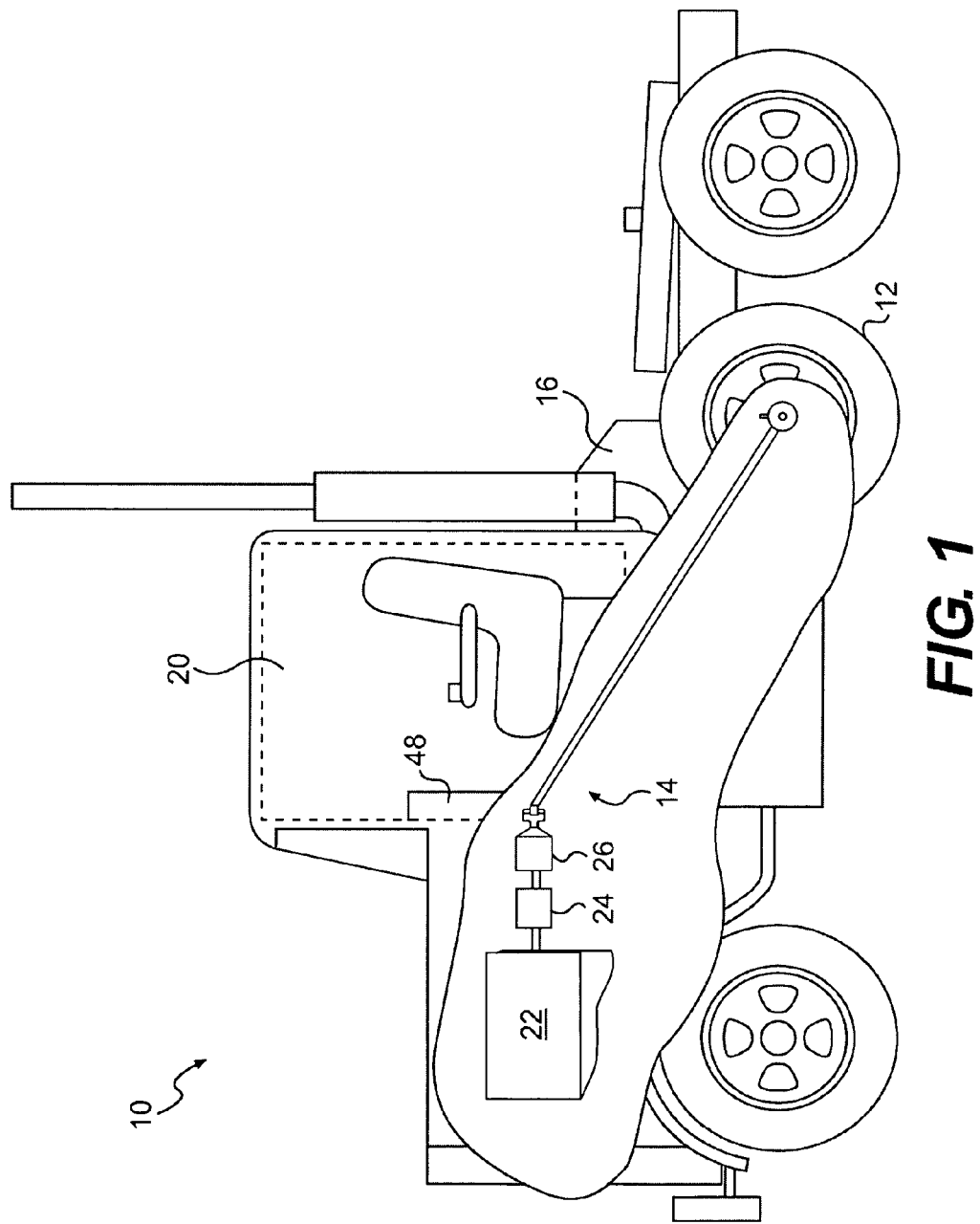
FIG. 1 is a diagrammatic view of a work machine, according to an exemplary disclosed embodiment.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the on-highway vocational vehicle depicted in FIG. 1, a bus, an off-highway haul truck, or any other type of machine known in the art. Machine 10 may include one or more traction devices 12 operatively connected to and driven by a power train 14, an auxiliary power unit ("APU") 16, a controller 18 configured to regulate the operation of power train 14 and auxiliary power unit 16 in response to one or more inputs, and a cab 20 for housing the operator.

Traction devices 12 may embody wheels located on each side of machine 10 (only one side shown). Alternatively, traction devices 12 may include tracks, belts or other known traction devices. It is contemplated that any combination of the wheels on machine 10 may be driven and/or steered.

Power train 14 may generate and transmit power to traction devices 12. In particular, power train 14 may include a power source 22 operable to generate a power output, an integral starter/generator 24, and a transmission unit 26 connected to receive the power output and transmit the power output in a useful manner to traction devices 12.

Power source 22 may include an internal combustion engine having multiple subsystems that cooperate to produce a mechanical or electrical power output. For the purposes of this disclosure, power source 22 is depicted and described as a four-stroke diesel engine. One skilled in the art will recognize, however, that power source 22 may be any other type of internal combustion engine such as, for example, a gasoline or a gaseous fuel-powered engine. The power source subsystems may include, for example, an exhaust system, a fuel system, an air induction system, a lubrication system, a cooling system, or any other appropriate system. It is contemplated that power source 22 may provide power for operation of machine 10, including electrical power to run devices inside cab 20. The devices may include, for example, refrigerators, televisions, radios, or any other devices designed to provide comfort to an operator seated within cab 20. It is contemplated that power source 22 may produce electrical power to run these devices through the use of starter/generator 24.

Figure 2:
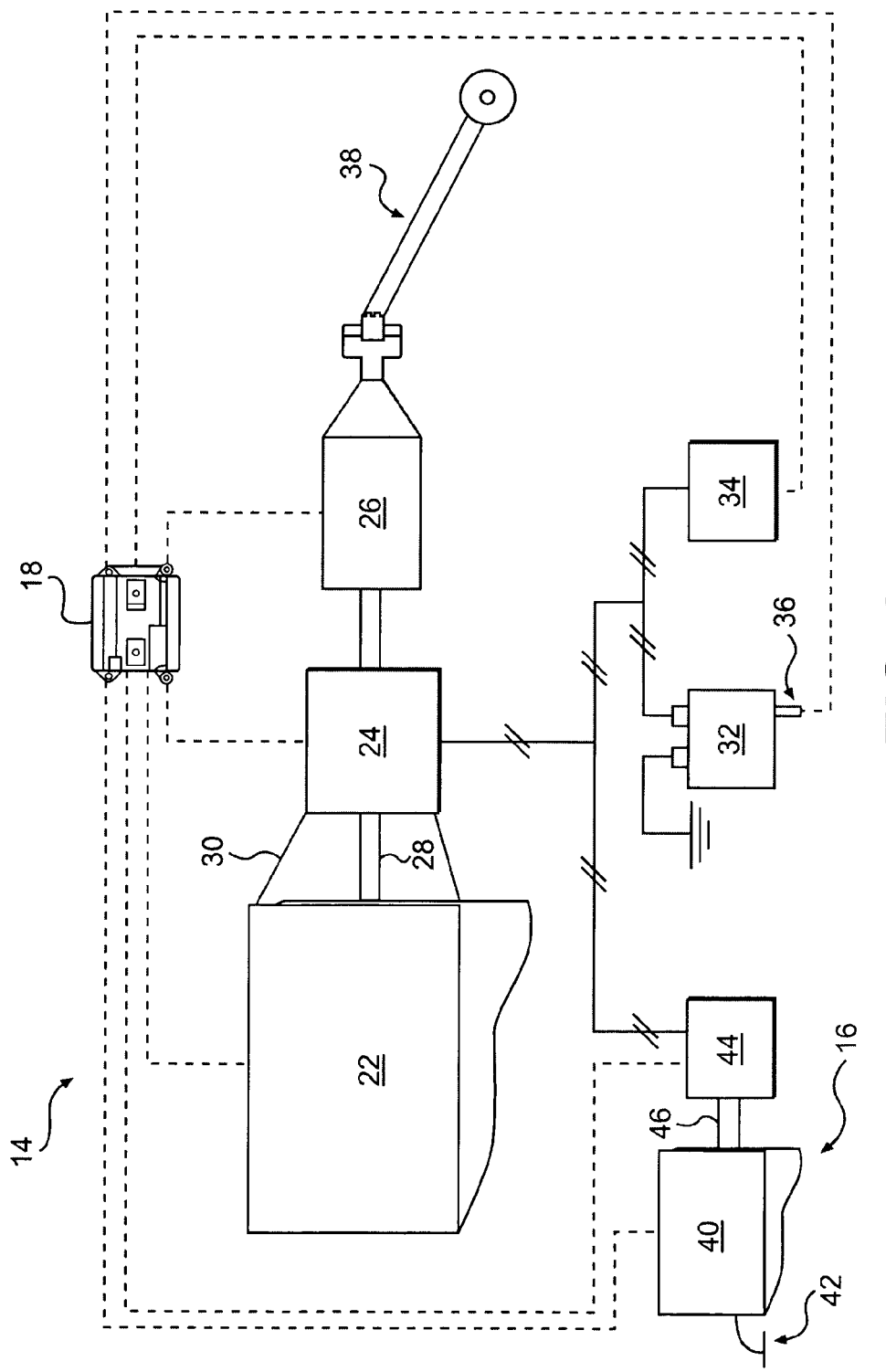
FIG. 2 is a block diagram of work machine components, according to an exemplary disclosed embodiment.

As illustrated in FIG. 2, starter/generator 24 may be operatively coupled to power source 22 via a crankshaft 28 and a clutch 30 or any other manner known in the art and may be located within the flywheel housing (not shown) of power source 22. Starter/generator 24 may be any known AC or DC generator such as, permanent magnet, induction, switched-reluctance, or a hybrid combination of the above. It is contemplated that starter/generator 24 can be configured to produce a direct current (DC) output or an alternating current (AC) output. It is also contemplated that AC or DC outputs may be converted with the use of a power converter (not shown) to produce a variety of current and/or voltage outputs for use by various components of machine 10.

Clutch 30 may be configured to engage and disengage starter/generator 24 with power source 22. Clutch 30 can be any type of clutch, such as, for example, an impellor clutch or a diaphragm clutch. The clutch may be operated manually by the operator from a user input device (not shown) in cab 20. Alternately, clutch 30 may be operated automatically by controller 18 in conjunction with the operation of other devices such as APU 16. It is contemplated that the engagement and disengagement of starter/generator 24 from power source 22 may be accomplished by devices known in the art other than a clutch, if desired.

Starter/generator 24 may be electrically coupled to an energy storage device 32 and may allow current to flow through starter/generator 24 in both directions. That is, in operation, starter/generator 24 may act as a starter, drawing energy from energy storage device 32, to rotate the crankshaft of power source 22, and, once power source 22 is operating, starter/generator 24 may be driven by power source 22 as a generator for recharging energy storage device 32 and powering accessory devices 34. Accessory devices 34 may include, for example, one or more of an air conditioning unit, a heating unit, lights, appliances, personal electronics, pumps, motors, and other electronic engine components and accessories known in the art. The recharging of energy storage device 32 may help to ensure that energy storage device 32 possesses enough charge to perform another power source cranking event during a subsequent starting request.

Energy storage device 32 may be a battery assembly and may include one or more devices configured to store electricity. For example, it is contemplated that energy storage device 32 may include first and second batteries connected in parallel. In an alternate embodiment, energy storage device 32 may additionally or alternately be a capacitor or any other device know in the art that is capable of storing electricity. Energy storage device 32 may be operatively connected to starter/generator 24 so that, in operation, energy storage device 32 may provide energy to and receive energy from starter/generator 24. Energy storage device 32 may also power accessory devices 34.

The amount of energy stored in energy storage device 32 may be detected by a sensor 36. Sensor 36 may be any type of sensor able to detect a parameter of energy storage device 32 indicative of the amount of energy stored in energy storage device 32. For example, sensor 36 may be a voltage sensor for sensing voltage across power storage device 32. Alternatively, sensor 36 may be a current sensor for sensing the amount of current stored in power storage device 32. In yet another embodiment, sensor 36 may be a temperature sensor for sensing the temperature of power storage device 32. The temperature of energy storage device 32 may be used in conjunction with various tables, graphs and algorithms to indirectly determine the amount of energy stored in energy storage device 32.

Transmission unit 26 may include numerous components that interact to transmit power from power source 22 to traction device 12. In particular, transmission unit 26 may be a multi-speed bidirectional mechanical transmission having a neutral gear ratio, a plurality of forward gear ratios, a reverse gear ratio, and one or more clutches (not shown). The output of transmission unit 26 may be connected to rotatingly drive traction device 12 via output shaft 38, thereby propelling machine 10.

It is contemplated that transmission unit 26 may alternately embody a hydraulic transmission having one or more pumps and hydraulic motors, a hydro-mechanical transmission having both hydraulic and mechanical components, an electric transmission having a generator and one or more electric motors, an electromechanical transmission having both electrical and mechanical components, or any other suitable transmission. It is also contemplated that transmission unit 26 may embody a continuously variable CVT type transmission, a step change transmission, or hybrid transmission having both continuously variable and discrete stepped output ratios.

APU 16 may be electrically connected to starter/generator 24, energy storage device 32, and include an auxiliary power source 40. Auxiliary power source 40 may be a smaller internal combustion engine separate from power source 22 and having limited capacity. It should be understood that, in an alternate embodiment, auxiliary power source 40 may be a fuel cell, electric motor, or any other power source known in the art. Due to auxiliary power source 40 being of a smaller size than power source 22, significantly less electrical input power may be required during start-up of auxiliary power source 40, as compared to that required for start-up of power source 22. The initial source of power for starting auxiliary power source 40 may come from energy storage device 32, and once started, auxiliary power source 40 may be fueled by diesel fuel, gasoline, gaseous fuels, or other types of fuel. It is contemplated that auxiliary power source 40 may have a pull cord 42 so that in certain situations, the operator may be able to manually start auxiliary power source 40, without relying on electrical power from energy storage device 32.

APU 16 may also include a generator 44. Generator 44 may be any known AC or DC generator such as, permanent magnet, induction, switched-reluctance, or a hybrid combination of the above. Generator 44 may be operatively coupled to auxiliary power source 40 via a crankshaft 46, or in any other manner known in the art, and may be configured to convert at least a portion of a power output of auxiliary power source 40 to electrical energy. It is to be contemplated that generator 44 can produce a direct current (DC) output or an alternating current (AC) output. It is also contemplated that AC or DC outputs may be converted with the use of a power converter (not shown) to produce a variety of current and/or voltage outputs for use by various components of machine 10.

It is contemplated that, as APU 16 operates, it may charge energy storage device 32 and provide electrical power that may be additive to that provided by power source 22 and starter/generator 24. In addition, APU 16 may operate in a vehicle drive mode during circumstances when machine 10 needs to be moved and either power source 22 cannot be started or it is more efficient to use APU 16 instead of power source 22. When operating in vehicle drive mode, controller 18 may operate clutch 30 to disengage power source 22 from start/generator 24. With power source 22 disengaged from starter/generator 24, APU 16 may bypass power source 22 and directly power transmission unit 26 via starter/generator 24. It is contemplated that clutch 30 may be omitted and that APU 16 be capable of powering both power source 22 and transmission unit 26, if desired.

Controller 18 may take many forms, including, for example, a computer based system, a microprocessor based system, a microcontroller, or any other suitable control type circuit or system. Controller 18 may also include memory for storage of a control program for operation and control of power source 22, APU 16, and/or other work machine components. Furthermore, controller 18 may communicate with a set of sensors including sensor 36 measuring temperature, battery voltage, power usage, and/or values indicative thereof. It is contemplated that controller 18 may reference tables, graphs, and/or equations included in its memory and use the sensed information and/or values received from the sensors to determine whether activation of APU 16 may be required to move machine 10.

Referring back to FIG. 1, cab 20 may embody an enclosed area of machine 10 configured to house the operator. Cab 20 may also include a dashboard (instrument panel) 48 that contains dials and/or controls for conveying information and for operating work machine 10 and its various components. Dashboard 48 may also include a display system and a user interface (not shown). The display system may include a computer monitor with an audio speaker, video screen, or any other suitable visual display device that conveys information to the operator. For example, a sensor (not shown) may sense a parameter of power source 22 such as, for example, power source speed or voltage, which may indicate whether energy storage device 32 was able to start power source 22. The display system may communicate this information to the operator. It is further contemplated that the user interface may include a keyboard, touch screen, number pad, or any other suitable input device.

The display system on dashboard 48 may communicate with controller 18 to, for example, inform the operator of the need to start APU 16 to move machine 10. It is also contemplated that controller 18 may automatically start APU 16 when the operator performs the power source cranking event, if the power source cranking event fails to start power source 22 or if the operator attempts to start power source 22 and insufficient power is available. It is further contemplated that the operator may simply know from training and/or experience when to start APU 16 to move machine 10. For example, upon recognizing that power source 22 has an internal mechanical failure or for efficiency or regulatory reasons, the operator may realize that APU 16 should be started in order to move machine 10.

It is contemplated that in an alternate embodiment, the disclosed electronic starter system may be replaced by a pneumatic starter system (not shown), if desired. In the pneumatic starter system, starter/generator 24 may be replaced by an air compressor or air pump and a turbine. The air compressor may perform the generator function of starter/generator 24, and the turbine may perform the starter motor function of starter/generator 24. In addition, energy storage device 32 may be replaced by a compressed air tank. In the system, air from the compressed air tank may enter the turbine and spin the vanes of the turbine. The turbine may be operatively coupled to power source 22 through a ring gear of the flywheel of power source 22 or any other means known in the art. The spinning of the vanes in the turbine may cause the ring gear of the flywheel to spin which in turn may cause the crankshaft of power source 22 to spin. Once power source 22 is started it may power the air compressor to recharge the compressed air tank.

Figure 3:
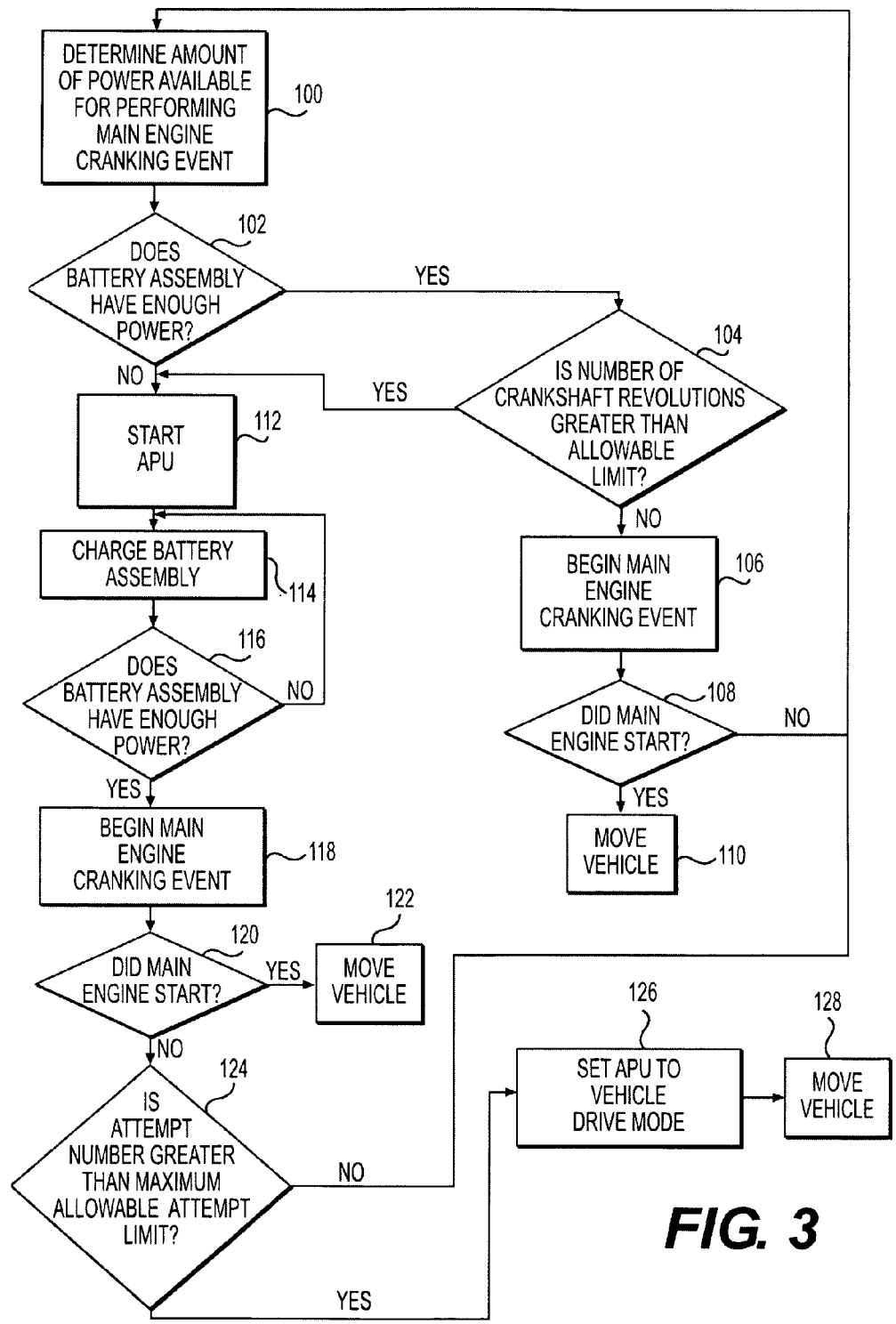
FIG. 3 is a flow diagram of a method, according to an exemplary disclosed embodiment.

FIG. 3 is a flow diagram of a method according to an exemplary disclosed embodiment. FIG. 3 will be explained in more detail in the following section.

INDUSTRIAL APPLICABILITY

The disclosed APU may provide a reliable alternative power source for moving a vehicle in certain situations. In particular, APU 16 may move vehicle 10 in situations where it is impossible or inefficient to crank main engine 22. By coupling APU 16 to transmission 26 via starter/generator 24, APU 16 can move vehicle 10 to a more accessible location or suitable location. The operation of the APU 16 will now be explained.

FIG. 3 illustrates a flow diagram depicting an exemplary method of using APU 16. The method may begin when the operator activates a user input device, i.e., turning a key, pressing a button, or turning a knob in an attempt to crank main engine 22. A determination may be made as to the amount of power available for performing the main engine cranking event and start-up of main engine 22 (step 100).

This determination may be made by analyzing data sensed by battery sensor 36. Battery sensor 36 may sense a parameter of battery assembly 32 such as, for example, the voltage or temperature of battery assembly 32. Controller 18, may communicate with battery sensor 36 and compare the data with tables, graphs, and/or equations stored in its memory. It is also contemplated that controller 18 may communicate with a temperature sensor (not shown) capable of determining the temperature of the environment and/or work machine 10 and its various components. Controller 18 may reference the tables, graphs, and/or equations located in its memory that may allow it to determine, based on the temperature values, both the charge present in battery assembly 32 and anticipated battery performance. Anticipated battery performance may be determined by how many cranking events may be attempted based on the amount of power stored in battery assembly 32. Anticipated battery performance may also be determined by the ability of battery assembly 32 to start APU 16. Additionally or alternatively, the operator may determine whether there is sufficient power for the main engine cranking event based on environmental conditions and/or personal experience.

If it is determined that the charge in battery assembly 32 is sufficient for performing the main engine cranking event and starting main engine 22, then assistance from APU 16 may be undesired (step 102: Yes). If, on the other hand, it is determined that the charge is insufficient, then assistance from APU 16 may be desired (step 102: No).

If the charge in battery assembly 32 is sufficient for performing the main engine cranking event, and cranking has started, the number of crankshaft revolutions may be tracked and compared to a threshold value such as, for example, three or four revolutions (step 104). The threshold value may be determined by the operator or by controller 18 through a counter (not shown). Exceeding the threshold value of crankshaft revolutions may indicate a situation where battery assembly 32 cannot start main engine 22. Therefore, if it has been determined that the limit on the number of crankshaft revolutions has been exceeded (step 104: Yes), then APU 16 may be manually or automatically started (step 112). However, if it has been determined that the limit on the number of crankshaft revolutions has not yet been reached (step 104: No), then the operator may perform or continue to perform a conventional main engine cranking event (step 106).

Next, a determination may be made as to whether main engine 22 has started (step 108). Such determination may be made by controller 18 through communication with a sensor such as an engine speed sensor. Alternatively, the determination may be made by the operator through observation. If the main engine cranking event succeeds in starting main engine 22 (step 108: Yes), then vehicle 10 can be moved in a conventional manner (step 110). If, however, the main engine cranking event fails to start main engine 22 (step 108: No), then the power available in battery assembly 32 may be reevaluated for performing additional main engine cranking events (step 100).

If assistance from APU 16 is desired, APU 16 may be started (step 112) to assist battery assembly 32 perform the main engine cranking event. It is contemplated that APU 16 may be automatically started. Alternatively, APU 16 may be manually started by the operator through a user input device such as a keyboard, touch screen, number pad, or any other suitable input device located on dashboard 48 in response to information displayed to the operator on a display or monitor also located on dashboard 48. APU 16 may also be manually started by pulling a starter rope 42. APU 16 may assist battery assembly 32 by transmitting power to and charging battery assembly 32 (step 114). In an alternative embodiment, APU 16 may bypass battery assembly 32 and directly crank main engine 22 by transmitting power to starter/generator 24.

Once APU 16 has begun charging battery assembly 32, the next step may involve determining whether the power in battery assembly 32 has been replenished to a predetermined level (step 116). Such a predetermined level may be any of a number of thresholds including, for example, enough power to perform a predetermined number cranking events or the maxim power capable of being stored by battery assembly 32. Controller 18 may make the determination by analyzing parameters sensed by battery sensor 36 and referencing the tables, graphs, and/or equations located in its memory. If it is determined that battery assembly 32 has not been charged to a level at or above the predetermined threshold (step 116: No), then APU 16 may continue charging battery assembly 32. However, if it is determined that battery assembly 32 has been charged to a level at or above the predetermined threshold (step 116: Yes), then the operator may be informed that the main engine cranking event may be attempted, and the operator may begin the main engine cranking event (step 118). Alternatively, controller 18 may automatically begin the main engine cranking event upon the determination that battery assembly 32 has be charged to a level at or above the predetermined threshold.

Next, a determination may be made as to whether main engine 22 has started (step 120). Such determination may be made by the controller through communication with sensors such as an engine speed sensor. Alternatively, the determination may be made by the operator through observation. If the main engine cranking event succeeds in starting main engine 22 (step 120: Yes), then vehicle 10 can be moved in the conventional manner (step 122). If, however, the main engine cranking event fails to start main engine 22 (step 120: No), then it may be determined whether the main engine cranking attempt has exceeded a predetermined number of attempts such as, for example, three or four attempted main engine cranking events (step 124). The threshold value may be determined by the operator or by controller 18 through a counter (not shown). It is contemplated that the thresholds in steps 104 and 124 may be related or independent of each other.

Exceeding the threshold value of cranking event attempts may indicate a situation where main engine 22 cannot be started. Therefore, if it has been determined that the limit on the number of main engine cranking events has been exceeded (step 124: Yes), then APU 16 may be set to vehicle drive mode (step 126) where APU 16 is utilized to propel vehicle 10. However, if it has been determined that the limit on the number of main engine cranking events has not been reached (step 124: No), then step 100 and all subsequent steps of the disclosed method may be performed. It should be understood that limiting the number of main engine cranking events may prevent wear to main engine 22 that might result from an excessive number of failed cranking events.

In vehicle drive mode, the electrical power produced by generator 44 may be transmitted to drive starter/generator 24. Starter/generator 24 may be disengaged from main engine 22 by the activation of clutch 30 and operated as a motor by converting the electrical power from generator 44 to mechanically power transmission 26. Transmission 26 may, in turn, drive traction devices 12. In this manner, APU 16 may drive vehicle 10 (step 128).

It should be understood that APU 16 may operate in vehicle drive mode even in situations when main engine 22 is fully operable. Such situations may occur when, for example, it is more efficient to operate APU 16 than main engine 22, noise ordinances restrict the operation of main engine 22, or other situations that may restrict the use of main engine 22. In these situations, regardless of battery voltage or previous cranking events, clutch 30 may be caused to disengage starter/generator 24 from main engine 22. Starter/generator 24 may then operate as a motor, driving transmission 26 and being powered by APU 16, as described above.

Because the disclosed auxiliary power unit is capable of powering the vehicle, it may be unnecessary to bring in servicing equipment such as towing vehicles and battery chargers to remote or difficult to reach locations, which may be costly and time consuming when the vehicle is disabled. Instead, the vehicle may be moved to the servicing equipment via the APU. In addition, by bypassing the main engine, the disclosed system can power the vehicle in most situations where the main engine fails including those situations where main engine failure is not caused by battery failure. It should also be noted that the disclosed system is useful for powering the vehicle when it is inefficient to use the main engine to power the vehicle.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A power system comprising:
    at least one traction device;
    a primary power source configured to power the at least one traction device; and
    an auxiliary power unit also configured to power the at least one traction device, the auxiliary power unit including:
        an auxiliary power source; and an auxiliary generator operationally independent of the primary power source and configured to convert power produced by the auxiliary power source to electrical power.

2. The power system of claim 1, wherein the auxiliary power source can be started manually.

3. The power system of claim 1, wherein the auxiliary power unit is configured to selectively power the at least one traction device in a limited capacity when the primary power source fails.

4. The power system of claim 3, further including a sensor and an energy storage device operatively connected to the primary power source and the auxiliary power unit, wherein the sensor is configured to detect a parameter of the energy storage device indicative of the amount of energy stored in the energy storage device.

5. The power system of claim 4, further including a controller configured to automatically start the auxiliary power unit when the detected parameter indicates an amount of energy stored in the energy storage device being below a predetermined threshold.

6. The power system of claim 4, wherein the auxiliary power unit is configured to selectively power the at least one traction device when the detected parameter indicates an amount of energy stored in the energy storage device being above or at the predetermined threshold and the primary power source cannot be started.

7. The power system of claim 6, wherein the parameter is indicative of at least one of a voltage, current, and temperature of the power storage device.

8. The power system of claim 6, further including an electronic starter system.

9. The power system of claim 6, further including a pneumatic starter system.

10. The power system of claim 1, wherein the auxiliary power unit is configured to selectively power the at least one traction device in a limited capacity even when the primary power source is operational.

11. The power system of claim 10, wherein the primary power source is configured to be disengaged from the at least one traction device when the auxiliary power unit selectively powers the at least one traction device.

12. A method for moving a machine, the method comprising:
   attempting to start a main power source using a starter;
   determining whether the starter started the main power source;
   using an auxiliary power source to provide power to the starter in response to a determination that the starter did not start the main power source;
   determining whether the starter is able to start the main power source using power provided by the auxiliary power source; and
   using the auxiliary power source to move the machine in response to a determination that the starter is unable to start the main power source using power provided by the auxiliary power source.

13. The method of claim 12, wherein attempting to start the main power source using the starter includes using energy from a storage device.

14. The method of claim 13, wherein attempting to start the main power source using the starter further includes detecting a parameter of the storage device indicative of the amount of energy stored in the storage device.

15. The method of claim 14, wherein attempting to start the main power source using the starter further includes using the auxiliary power source to provide energy to the storage device when the detected parameter is below a predetermined threshold.

16. The method of claim 15, wherein the detected parameter is indicative of at least one of a voltage, current, and temperature in the storage device.

17. A machine comprising:
   at least one traction device;
   a main engine configured to power the machine;
   a first generator configured to convert at least a portion of the power produced by the main engine to electrical power;
   a transmission configured to transmit at least a portion of the power produced by the main engine to the at least one traction device;
   a battery assembly configured to store electrical energy produced by the main engine; and
   an auxiliary power unit configured to transmit power to the transmission when the main engine cannot be started, wherein the auxiliary power unit includes:
   an auxiliary power source; and
   an auxiliary generator.

18. The machine of claim 17, wherein:
   the auxiliary generator is operatively connected to the auxiliary power source, the first generator and the battery assembly;
   the auxiliary generator is configured to convert power produced by the auxiliary power source to electrical power; and
   the auxiliary generator is configured to transmit the power converted by the auxiliary generator to the first generator and the battery assembly.

19. The machine of claim 18, wherein the auxiliary power source can be started manually.

* * * * *